United States Patent
Kim et al.

(10) Patent No.: US 12,495,833 B2
(45) Date of Patent: Dec. 16, 2025

(54) AEROSOL GENERATING DEVICE INCLUDING MULTIPLE INDUCTANCE CHANNELS

(71) Applicant: KT&G CORPORATION, Daejeon (KR)

(72) Inventors: Yong Hwan Kim, Gyeonggi-do (KR); Sung Wook Yoon, Gyeonggi-do (KR); Seung Won Lee, Gyeonggi-do (KR); Dae Nam Han, Seoul (KR)

(73) Assignee: KT&G Corporation, Daejeon (KR)

( * ) Notice: Subject to any disclaimer, the term of this patent is extended or adjusted under 35 U.S.C. 154(b) by 531 days.

(21) Appl. No.: 17/908,166

(22) PCT Filed: Apr. 27, 2021

(86) PCT No.: PCT/KR2021/005321
§ 371 (c)(1),
(2) Date: Aug. 30, 2022

(87) PCT Pub. No.: WO2021/246646
PCT Pub. Date: Dec. 9, 2021

(65) Prior Publication Data
US 2023/0112831 A1    Apr. 13, 2023

(30) Foreign Application Priority Data

Jun. 3, 2020  (KR) .................. 10-2020-0067166

(51) Int. Cl.
*A24F 40/465*    (2020.01)
*A24F 40/20*    (2020.01)
(Continued)

(52) U.S. Cl.
CPC ............ *A24F 40/465* (2020.01); *A24F 40/20* (2020.01); *A24F 40/53* (2020.01); *A24F 40/57* (2020.01);
(Continued)

(58) Field of Classification Search
None
See application file for complete search history.

(56) References Cited

U.S. PATENT DOCUMENTS

| | | |
|---|---|---|
| 5,194,805 A | 3/1993 | Nakajima et al. |
| 5,952,822 A | 9/1999 | Kayserman et al. |

(Continued)

FOREIGN PATENT DOCUMENTS

| | | |
|---|---|---|
| CN | 107070003 A | 8/2017 |
| CN | 109638974 A | 4/2019 |

(Continued)

OTHER PUBLICATIONS

Extended European Search Report issued Aug. 24, 2023 in Application No. 21817679.0.

(Continued)

*Primary Examiner* — Philip Y Louie
*Assistant Examiner* — Jeffrey A. Buckman
(74) *Attorney, Agent, or Firm* — Foley & Lardner LLP

(57) ABSTRACT

An aerosol generating device, including an inductance channel, includes: a heater configured to generate an aerosol by heating a cigarette; a cigarette insertion space into which the cigarette is inserted; a first inductance channel; a second inductance channel; and a controller configured to generate a control signal by using information received from the first inductance channel and the second inductance channel, wherein the controller measures, when an amount of a change in frequency of current flowing through the first inductance channel exceeds a first reference value due to an object adjacent to the cigarette insertion space, an amount of a change in frequency of current flowing through the second inductance channel and controls, when the measured amount (Continued)

of the change in frequency of the current is less than a second reference value, a power supply to the heater to be started.

20 Claims, 16 Drawing Sheets

(51) Int. Cl.
*A24F 40/53* (2020.01)
*A24F 40/57* (2020.01)
*H05B 6/06* (2006.01)
*H05B 6/10* (2006.01)
*H05B 6/44* (2006.01)

(52) U.S. Cl.
CPC .............. *H05B 6/06* (2013.01); *H05B 6/105* (2013.01); *H05B 6/44* (2013.01)

(56) References Cited

U.S. PATENT DOCUMENTS

| | | |
|---|---|---|
| 11,172,704 B2 | 11/2021 | Hon |
| 11,882,875 B2 | 1/2024 | Jung et al. |
| 2014/0340088 A1 | 11/2014 | Albrecht et al. |
| 2017/0064996 A1 | 3/2017 | Mironov |
| 2017/0311648 A1* | 11/2017 | Gill ........................ A24F 40/50 |
| 2020/0404969 A1 | 12/2020 | Zuber et al. |
| 2021/0007393 A1 | 1/2021 | Jung et al. |
| 2021/0045451 A1 | 2/2021 | Choi et al. |
| 2021/0076736 A1 | 3/2021 | Fernando et al. |
| 2021/0076742 A1 | 3/2021 | Gill |
| 2021/0120875 A1 | 4/2021 | Mironov |
| 2021/0267280 A1* | 9/2021 | Zigmund ................ A24F 40/50 |
| 2022/0125112 A1 | 4/2022 | Zuber et al. |
| 2022/0183377 A1* | 6/2022 | Blandino ................ A24F 40/57 |
| 2022/0354182 A1* | 11/2022 | Courbat ................. G05B 11/28 |
| 2022/0369714 A1* | 11/2022 | Butin ..................... A24F 40/53 |

FOREIGN PATENT DOCUMENTS

| | | |
|---|---|---|
| JP | 3-202701 A | 4/1991 |
| JP | 2013-511962 A | 4/2013 |
| JP | 2015-220934 A | 12/2015 |
| KR | 10-1991-0012668 A | 8/1991 |
| KR | 10-0165893 B1 | 3/1999 |
| KR | 10-2000-0038977 A | 7/2000 |
| KR | 10-2012-0002555 A | 1/2012 |
| KR | 10-2017-0007262 A | 1/2017 |
| KR | 10-1776966 B1 | 9/2017 |
| KR | 10-2019-0075181 A | 6/2019 |
| KR | 10-2020-0038050 A | 4/2020 |
| KR | 10-2020-0051604 A | 5/2020 |
| KR | 10-2020-0061233 A | 6/2020 |
| WO | 2017/001820 A1 | 1/2017 |
| WO | 2019/197170 A1 | 10/2019 |
| WO | WO-2020/105896 A1 | 5/2020 |
| WO | WO-2020/105943 A1 | 5/2020 |

OTHER PUBLICATIONS

Japanese Office Action issued Sep. 19, 2023 in Application No. 2022-558505.
Office Action dated Sep. 29, 2024, received in Chinese Patent Application No. 202180024057.3.
International Search Report for PCT/KR2021/005321 dated Sep. 7, 2021.
Written Opinion for PCT/KR2021/005321 dated Sep. 7, 2021.
Korean Non-Final Office Action for Korean Application No. 10-2020-0067166 dated Jan. 6, 2022, 92 pages.

* cited by examiner

AEROSOL GENERATING DEVICE INCLUDING MULTIPLE INDUCTANCE CHANNELS

CROSS REFERENCE TO RELATED APPLICATIONS

This application is a National Stage of International Application No. PCT/KR2021/005321 filed Apr. 27, 2021, claiming priority based on Korean Patent Application No. 10-2020-0067166 filed Jun. 3, 2020.

TECHNICAL FIELD

One or more embodiments relate to an externally heated aerosol generating device including an inductance channel, and more particularly, to an aerosol generating device capable of generating an aerosol by detecting a magnetic substance adjacent to an inductance channel and heating a cigarette while a heater included in the aerosol generating device does not directly contact the cigarette.

BACKGROUND ART

Recently, there has been increasing demand for alternative ways of overcoming the disadvantages of common cigarettes. For example, there is an increasing demand for a method of generating aerosol by heating an aerosol generating material in cigarettes, rather than by burning cigarettes. Accordingly, research into a heating-type cigarette or a heating-type aerosol generator has been actively conducted.

As aerosol generating devices have been widely distributed, users of aerosol generating devices tend to consider not only smoking satisfaction due to quality of an aerosol, but also various ease of use. For example, users prefer to visually check meaningful statistical values, such as use history, on display devices provided in aerosol generating devices. When aerosol generating devices are used for a long period of time, periodic cleaning of the aerosol generating devices is needed. Therefore, users prefer aerosol generating devices with functions allowing easy cleaning.

In addition, as part of increasing ease of use of an aerosol generating device, an aerosol generating device with a smart-on function has also been released. As soon as an aerosol generating material is mounted on an aerosol generating device with a smart-on function, a preparation process for using the aerosol generating device proceeds, thereby significantly reducing a time required for a user to turn on the aerosol generating device and inhale an aerosol through the aerosol generating device.

DISCLOSURE OF INVENTION

Technical Problem

One or more embodiments include an aerosol generating device with a smart-on function, the aerosol generating device including an inductance channel to implement the smart-on function and capable of preventing the smart-on function from being activated due to an effect of a magnetic substance approaching the aerosol generating device even though the magnetic substance is not an aerosol generating material.

Solution to Problem

According to one or more embodiments, an externally heated aerosol generating device, including an inductance channel, includes: a heater configured to generate an aerosol by heating a cigarette; a cigarette insertion space into which the cigarette is inserted; a first inductance channel; a second inductance channel; and a controller configured to generate a control signal by using information received from the first inductance channel and the second inductance channel, wherein the controller measures, when an amount of a change in frequency of current flowing through the first inductance channel exceeds a first reference value due to an object adjacent to the cigarette insertion space, an amount of a change in frequency of current flowing through the second inductance channel and controls, when the measured amount of the change in frequency of current is less than a second reference value, a power supply to the heater to be started.

According to one or more embodiments, an externally heated aerosol generating device, including an inductance channel, includes: a heater configured to generate an aerosol by heating a cigarette; a cigarette insertion space into which the cigarette is inserted; a first inductance channel in which a frequency of current is changed by an object inserted into the cigarette insertion space; a second inductance channel shielded by the heater so that a frequency of current flowing therethrough is not changed by the object inserted into the cigarette insertion space; and a controller configured to generate a control signal by using information received from the first inductance channel and the second inductance channel, wherein, when an amount of a change in frequency of current flowing through the first inductance channel exceeds a first reference value and an amount of a change in frequency of current flowing through the second inductance channel is less than a second reference value, the controller controls a power supply to the heater to he started.

Advantageous Effects of Invention

According to one or more embodiments, although a magnetic substance not including an aerosol generating material is adjacent to an externally heated aerosol generating device with a smart-on function, the smart-on function is not activated, thereby significantly reducing waste of a battery, and preventing overheating of a heater in a situation that is not recognized by a user.

BEST MODE FOR CARRYING OUT THE INVENTION

Figure 1:
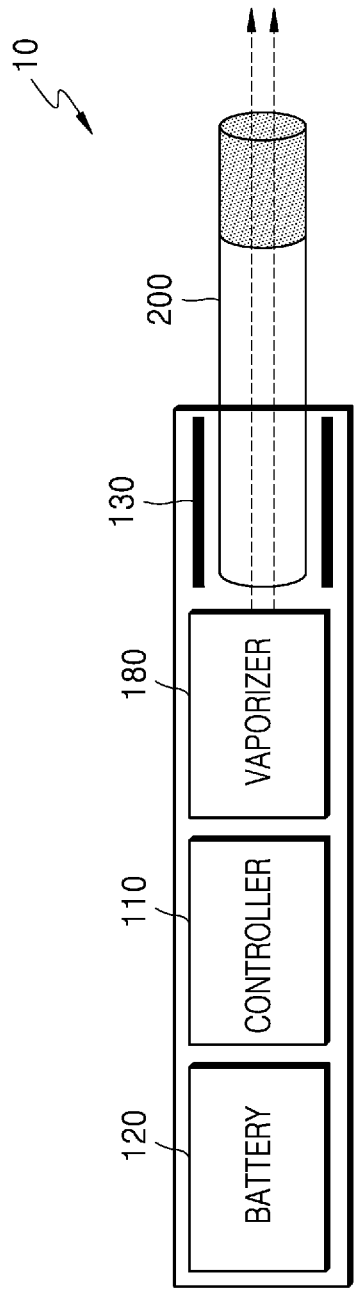
FIGS. 1 and 2 are diagrams showing examples in which a cigarette is inserted into an aerosol generating device.

According to one or more embodiments, an externally heated aerosol generating device, including an inductance channel, includes: a heater configured to generate an aerosol by heating a cigarette; a cigarette insertion space into which the cigarette is inserted; a first inductance channel; a second inductance channel; and a controller configured to generate a control signal by using information received from the first inductance channel and the second inductance channel, wherein the controller measures, when an amount of a change in frequency of current flowing through the first inductance channel exceeds a first reference value due to an object adjacent to the cigarette insertion space, an amount of a change in frequency of current flowing through the second inductance channel and controls, when the measured amount of the change in frequency of current is less than a second reference value, a power supply to the heater to be started.

The first inductance channel may include two or more inductors.

The first inductance channel may include two inductors, and the second inductance channel may include one inductor.

The inductors of the first inductance channel may be spaced apart from each other on the basis of the second inductance channel.

A winding direction of an inductor constituting the first inductance channel may be different from a winding direction of an inductor constituting the second inductance channel.

At least one of the first inductance channel and the second inductance channel may be arranged adjacent to the cigarette insertion space.

The cigarette insertion space may be recessed in a cylindrical shape so that a portion of the cigarette is inserted thereinto and heated by the heater, and the first inductance channel and the second inductance channel may be arranged in shapes surrounding an outer circumferential surface of the cigarette insertion space.

The heater may be a susceptor that heats according to the change in the current.

The heater may be divided into a first heater and a second heater according to a height of the cigarette insertion space, and the first heater and the second heater may heat to different temperatures.

The first inductance channel may include two inductors, and the inductors included in the first inductance channel may be arranged to correspond to the first heater and the second heater, respectively.

According to one or more embodiments, an externally heated aerosol generating device, including an inductance channel, includes: a heater configured to generate an aerosol by heating a cigarette; a cigarette insertion space into which the cigarette is inserted; a first inductance channel in which a frequency of current is changed by an object inserted into the cigarette insertion space; a second inductance channel shielded by the heater so that a frequency of current flowing therethrough is not changed by the object inserted into the cigarette insertion space; and a controller configured to generate a control signal by using information received from the first inductance channel and the second inductance channel, wherein, when an amount of a change in frequency of current flowing through the first inductance channel exceeds a first reference value and an amount of a change in frequency of current flowing through the second inductance channel is less than a second reference value, the controller controls a power supply to the heater to be started.

The first inductance channel may include two or more inductors.

The first inductance channel may include two inductors, and the second inductance channel may include one inductor.

The inductors of the first inductance channel may be spaced apart from each other on the basis of the second inductance channel.

A winding direction of an inductor constituting the first inductance channel may be different from a winding direction of an inductor constituting the second inductance channel.

At least one of the first inductance channel and the second inductance channel may be arranged adjacent to the cigarette insertion space.

The cigarette insertion space may be recessed in a cylindrical shape so that a portion of the cigarette is inserted thereinto and heated by the heater, and the first inductance channel and the second inductance channel may be arranged in shapes surrounding an outer circumferential surface of the cigarette insertion space.

The heater may be a susceptor that heats according to the change in the current.

The heater may be divided into a first heater and a second heater according to a height of the cigarette insertion space, and the first heater and the second heater may heat to different temperatures.

The first inductance channel may include two inductors, and the inductors included in the first inductance channel may be arranged to correspond to the first heater and the second heater, respectively.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like, There are terms discretionally selected by an applicant on particular occasions. These terms will be explained in detail in relevant description. Therefore, terms used herein are not just names but should be defined based on the meaning of the terms and the whole content of the present disclosure.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

The attached drawings for illustrating one or more embodiments are referred to in order to gain a sufficient understanding, the merits thereof, and the objectives accomplished by the implementation. The disclosure may, however, be embodied in many different forms and should not be construed as being limited to the embodiments set forth herein.

Hereinafter, embodiments of the present disclosure will be described in detail with reference to the drawings.

Figure 2:
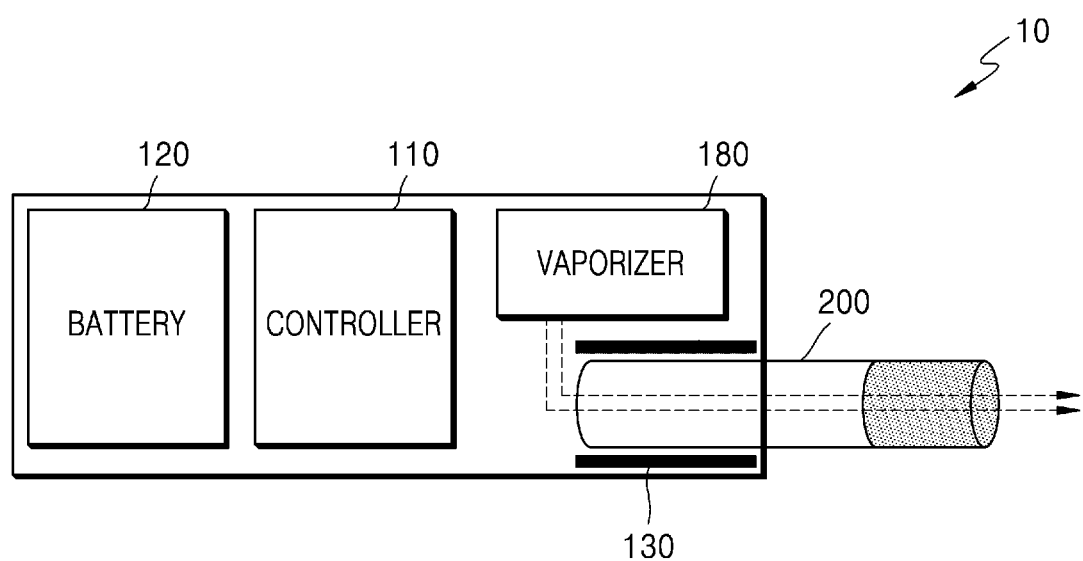

FIGS. 1 and 2 are diagrams showing examples in which a cigarette is inserted into an aerosol generating device.

Referring to FIGS. 1 and 2, an aerosol generating device 10 includes a battery 120, a controller 110, a heater 130 and a vaporizer 180. A cigarette 200 may be inserted into an internal space of the aerosol generating device 10.

The elements related to the embodiment are illustrated in the aerosol generating device 10 of FIGS. 1 to 2. Therefore, one of ordinary skill in the art would appreciate that other universal elements than the elements shown in FIGS. 1 to 2 may be further included in the aerosol generating device 10.

In addition, although it is shown that the heater 130 is included in the aerosol generating device 10 in FIGS. 1 and 2, the heater 130 may be omitted if necessary.

In FIG. 1, the battery 120, the controller 110, the heater 130 and the vaporizer 180 are arranged in a row. Also, FIG. 2 shows that the vaporizer 180 and the heater 130 are arranged in parallel with each other. However, an internal structure of the aerosol generating device 10 is not limited to the examples shown in FIG. 1 or 2. That is, according to a design of the aerosol generating device 10, arrangement of the battery 120, the controller 110, the heater 130, and the vaporizer 180 may be changed.

When the cigarette 200 is inserted into the aerosol generating device 10, the aerosol generating device 10 operates the heater 130 and/or the vaporizer 180 to generate aerosol from the cigarette 200 and/or the vaporizer 180. The aerosol generated by the vaporizer 180 may be transferred to a user via the cigarette 200. The vaporizer 180 will be described in more detail below.

The battery 120 supplies the electric power used to operate the aerosol generating device 10. For example, the battery 120 may supply power for heating the heater 130 or the vaporizer 180 and supply power for operating the controller 110. In addition, the battery 120 may supply power for operating a display, a sensor, a motor, and the like installed in the aerosol generating device 10.

The controller 110 controls the overall operation of the aerosol generating device 10. In detail, the controller 110 may control operations of other elements included in the aerosol generating device 10, as well as the battery 120, the heater 130, and the vaporizer 180. Also, the controller 110 may check the status of each component in the aerosol generating device 10 to determine whether the aerosol generating device 10 is in an operable state.

The controller 110 includes at least one processor. A processor may be implemented as an array of a plurality of logic gates or may be implemented as a combination of a general-purpose microprocessor and a memory in which a program executable by the microprocessor is stored. It will be understood by one of ordinary skill in the art that the present disclosure may be implemented in other forms of hardware.

The heater 130 may he heated by the electric power supplied from the battery 120.

For example, when the cigarette is inserted in the aerosol generating device 10, the heater 130 may be located outside the cigarette. Therefore, the heated heater 130 may raise the temperature of an aerosol generating material in the cigarette.

The heater 130 may be an electro-resistive heater. For example, the heater 130 includes an electrically conductive track, and the heater 130 may be heated as a current flows through the electrically conductive track. However, the heater 130 is not limited to the above example, and any type of heater may be used provided that the heater is heated to a desired temperature. Here, the desired temperature may be set in advance on the aerosol generating device 10, or may he set by a user.

In addition, in another example, the heater 130 may include an induction heating type heater. In detail, the heater 130 may include an electrically conductive coil for heating the cigarette in an induction heating method, and the cigarette may include a susceptor that may be heated by the induction heating type heater.

In the FIGS. 1 and 2, the heater 130 is shown to be disposed outside the cigarette 200, but is not limited thereto. For example, the heater 130 may include a tubular heating element, a plate-shaped heating element, a needle-shaped heating element, or a rod-shaped heating element. And the inside or outside of the cigarette 200 is can be heated by the heating element.

Also, there may be a plurality of heaters 130 in the aerosol generating device 10. Here, the plurality of heaters 130 may be arranged to be inserted into the cigarette 200 or on the outside of the cigarette 200. Also, some of the plurality of heaters 130 may be arranged to be inserted into the cigarette 200 and the other may be arranged on the outside of the cigarette 200. In addition, the shape of the heater 130 is not limited to the example shown in FIGS. 1 and 2, but may be manufactured in various shapes.

The vaporizer 180 may generate aerosol by heating a liquid composition and the generated aerosol may be delivered to the user after passing through the cigarette 200. In other words, the aerosol generated by the vaporizer 180 may move along an air flow passage of the aerosol generating device 10, and the air flow passage may be configured for the aerosol generated by the vaporizer 180 to be delivered to the user through the cigarette.

For example, the vaporizer 180 may include a liquid storage unit, a liquid delivering unit, and a heating element, but is not limited thereto. For example, the liquid storage unit, the liquid delivering unit, and the heating element may be included in the aerosol generating device 10 as independent modules.

The liquid storage may store a liquid composition. For example, the liquid composition may be a liquid including a tobacco containing material including a volatile tobacco flavor component, or a liquid including a non-tobacco material. The liquid storage unit may be attached to/detached from the vaporizer 180 or may be integrally manufactured with the vaporizer 180.

For example, the liquid composition may include water, solvents, ethanol, plant extracts, flavorings, flavoring agents, or vitamin mixtures. The flavoring may include, but is not limited to, menthol, peppermint, spearmint oil, various fruit flavoring ingredients, etc. The flavoring agent may include components that may provide the user with various flavors or tastes. Vitamin mixtures may be a mixture of at least one of vitamin A, vitamin B, vitamin C, and vitamin E, but are not limited thereto. Also, the liquid composition may include an aerosol former such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivering unit. For example, the heating element may be a metal heating wire, a metal hot plate, a ceramic heater, or the like, but is not limited thereto. In addition, the heating element may include a conductive filament such as nichrome wire and may be wound around the liquid delivery element. The heating element may be heated by a current supply and may transfer heat to the liquid composition in contact with the heating element, thereby heating the liquid composition. As a result, aerosol may be generated.

For example, the vaporizer 180 may be referred to as a cartomizer or an atomizer, but is not limited thereto.

The aerosol generating device 10 may further include universal elements, in addition to the battery 120, the controller 110, the heater 130, and the vaporizer 180. For example, the aerosol generating device 10 may include a display capable of outputting visual information and/or a motor for outputting tactile information. In addition, the aerosol generating device 10 may include at least one sensor (a puff sensor, a temperature sensor, a cigarette insertion sensor, etc.) Also, the aerosol generating device 10 may be manufactured to have a structure, in which external air may be introduced or internal air may be discharged even in a state where the cigarette 200 is inserted.

Although not shown in FIGS. 1 and 2, the aerosol generating device 10 may configure a system with an additional cradle. For example, the cradle may be used to charge the battery 120 of the aerosol generating device 10. Alternatively, the heater 130 may be heated in a state in which the cradle and the aerosol generating device 10 are coupled to each other.

The cigarette 200 may be similar to a typical burning cigarette. For example, the cigarette 200 may include a first portion containing an aerosol generating material and a second portion including a filter and the like. Alternatively, the second portion of the cigarette 200 may also include the aerosol generating material. For example, an aerosol generating material made in the form of granules or capsules may be inserted into the second portion.

The entire first portion may be inserted into the aerosol generating device 10 and the second portion may be exposed to the outside. Alternatively, only a portion of the first portion may be inserted into the aerosol generating device 10 or the entire first portion and a portion of the second portion may be inserted into the aerosol generating device 10. The user may puff aerosol while holding the second portion by the mouth of the user. At this time, the aerosol is generated by as the outside air passes through the first portion, and the generated aerosol passes through the second portion and is delivered to a user's mouth.

For example, the outside air may be introduced through at least one air passage formed in the aerosol generating device 10. For example, the opening and closing of the air passage formed in the aerosol generating device 10 and/or the size of the air passage may be adjusted by a user. Accordingly, the amount of smoke and a smoking impression may be adjusted by the user. In another example, the outside air may be introduced into the cigarette 200 through at least one hole formed in a surface of the cigarette 200.

Figure 3:
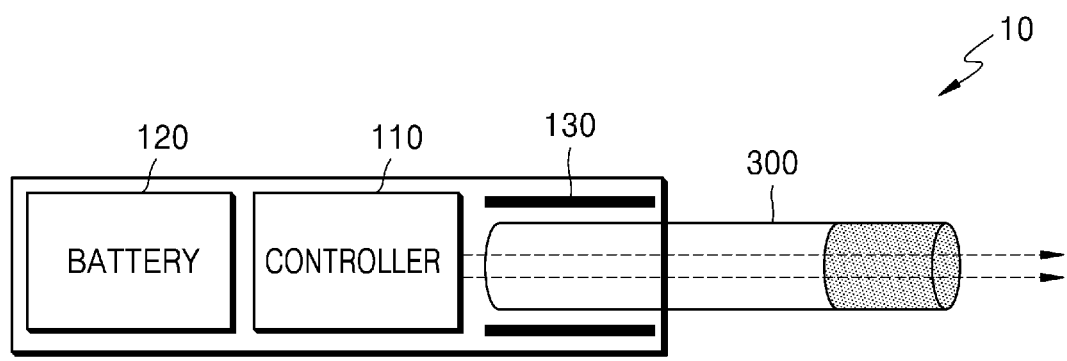
FIG. 3 is a view showing another example in which a cigarette is inserted into an aerosol generating device.

FIG. 3 is a diagram illustrating another example in which a cigarette is inserted into an aerosol generating device.

When FIG. 3 is compared with the aerosol generating apparatus described through FIGS. 1 and 2, it can be seen that the vaporizer 180 is omitted. Since the element that performs the function of the vaporizer 180 is included in the double medium cigarette 300 inserted into the aerosol generating device shown in FIG. 3, the aerosol generating device shown in FIG. 3 is not included the vaporizer 180.

When the double medium cigarette 300 is inserted the aerosol generating device 10 in FIG. 3, the double medium cigarette 300 is externally heated, so that a user inhalable aerosol can be generated from the double medium cigarette 300. The aerosol generating device 10 shown in FIG. 3 may have the heater 130 which is divided into two parts to heat the first medium part and the second medium part of the double medium cigarette. 300. The first medium part and the second medium part can be heated at different temperatures. A schematic description of this will be described in FIG. 11. Also, the double medium cigarette 300 will be described in FIG. 6.

Hereinafter, an example of the cigarette 200 will be described with reference to FIG. 4.

Figure 4:
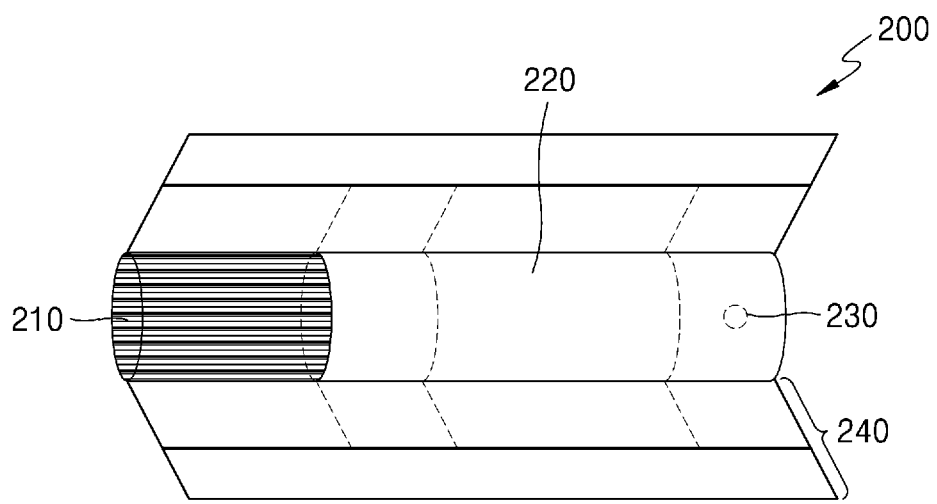
FIG. 4 is a view showing an example of a cigarette.

FIG. 4 is a drawing illustrating an example of a cigarette.

Referring to FIG. 4, the cigarette 200 includes a tobacco rod 210 and a filter rod 220. The first portion described above with reference to FIGS. 1 to 2 include the tobacco rod 210 and the second portion includes the filter rod 220.

In FIG. 4, the filter rod 220 is shown as a single segment, but is not limited thereto. In other words, the filter rod 220 may include a plurality of segments. For example, the filter rod 220 may include a first segment for cooling down the aerosol and a second segment for filtering a predetermined component included in the aerosol. Also, if necessary, the filter rod 220 may further include at least one segment performing another function.

The cigarette 200 may be packaged by at least one wrapper 240. The wrapper 240 may include at least one hole through which the outside air is introduced or inside air is discharged. For example, the cigarette 200 may be packaged by one wrapper 240. In another example, the cigarette 200 may be packaged by two or more wrappers 240. For example, the tobacco rod 210 may be packaged by a first wrapper and the filter rod 220 may be packaged by a second wrapper. In addition, the tobacco rod 210 and the filter rod 220 are respectively packaged by single wrappers, and then, the cigarette 200 may be entirely re-packaged by a third wrapper. When each of the tobacco rod 210 and the filter rod 220 includes a plurality of segments, each of the segments may be packaged by a single wrapper. In addition, the cigarette 200, in which the segments respectively packaged by the single wrappers are coupled to one another, may be repackaged by another wrapper.

The tobacco rod 210 includes an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. In addition, the tobacco rod 210 may include other additive materials like a flavoring agent, a wetting agent, and/or an organic acid. Also, a flavoring liquid such as menthol, humectant, etc. may be added to the tobacco rod 210 by being sprayed to the tobacco rod 210.

The tobacco rod 210 may be manufactured variously. For example, the tobacco rod 210 may be fabricated as a sheet or a strand. Also, the tobacco rod 210 may be fabricated by tobacco leaves that are obtained by fine-cutting a tobacco sheet. Also, the tobacco rod 210 may be surrounded by a heat conducting material. For example, the heat-conducting material may be, but is not limited to, a metal foil such as aluminum foil. For example, the heat conducting material surrounding the tobacco rod 210 may improve a thermal conductivity applied to the tobacco rod by evenly dispersing the heat transferred to the tobacco rod 210, and thus, improving tobacco taste. Also, the heat conducting material surrounding the tobacco rod 210 may function as a susceptor that is heated by an inducting heating-type heater. Although not shown in the drawings, the tobacco rod 210 may further include a susceptor, in addition to the heat conducting material surrounding the outside thereof.

The filter rod 220 may be a cellulose acetate filter. In addition, the filter rod 220 is not limited to a particular shape. For example, the filter rod 220 may be a cylinder-type rod or a tube-type rod including a cavity therein. Also, the filter rod 220 may be a recess type rod. When the filter rod 220 includes a plurality of segments, at least one of the plurality of segments may have a different shape from the others.

The filter rod 220 may be manufactured to generate flavor. For example, a flavoring liquid may be sprayed to the filter rod 220 or separate fibers on which the flavoring liquid is applied may be inserted in the filter rod 220.

Also, the filter rod 220 may include at least one capsule 230. Here, the capsule 230 may generate flavor or may generate aerosol. For example, the capsule 230 may have a structure, in which a liquid containing a flavoring material is wrapped with a film. The capsule 230 may have a circular or cylindrical shape, but is not limited thereto.

When the filter rod 220 includes a segment for cooling down the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above examples, and may include any material provided that a function of cooling down the aerosol is implemented.

Although not shown in FIG. 4, the cigarette 200 according to the embodiment may further include a front-end filter. The front-end filter is at a side facing the filter rod 220, in the tobacco rod 210. The front-end filter may prevent the tobacco rod 210 from escaping to the outside and may prevent the liquefied aerosol from flowing to the aerosol generating device 10 (see FIGS. 1 to 2) from the tobacco rod 210 during smoking.

Figure 5:
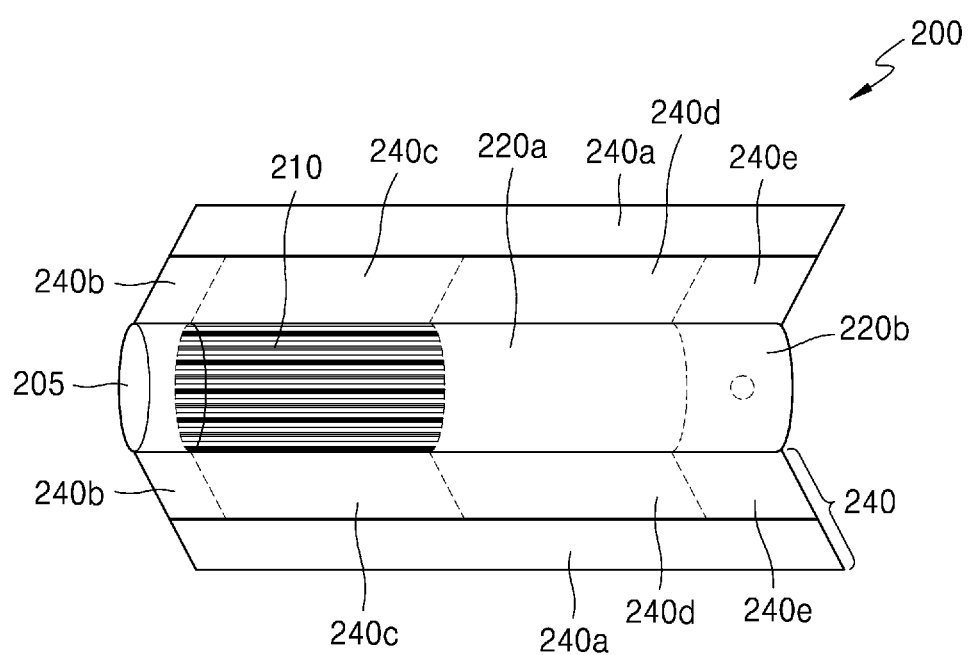
FIG. 5 is a view showing another example of a cigarette.

FIG. 5 is a view illustrating another example of a cigarette.

Referring to FIG. 5, it can be seen that the cigarette 200 has a form in which a cross tube 205, the tobacco rod 210, a tube 220a, and a filter 220b are wrapped by the final wrapper 240. In FIG. 5, the wrapper includes individual wrappers that are individually wrapped around the cross tube 205, the tobacco rod 210, the tube 220a, and the filter 220b, and a final wrapper that is collectively wrapped around the cross tube 205, the tobacco rod 210, the tube 220a, and the filter 220b.

The first portion described above with reference to FIGS. 1 and 2 includes the cross tube 205 and the tobacco rod 210, and the second portion includes the filter rod 220. For the sake of convenient description, the following description will be made with reference to FIGS. 1 and 2, and description overlapping with the description made with reference to FIG. 4 will be omitted.

The cross tube 205 refers to a cross-shaped tube connected to the tobacco rod 210.

The tobacco rod 210 includes an aerosol generating substrate that generates an aerosol by being heated by the heater 130 of the aerosol generation device 10.

The tube 220a performs a function of transferring an aerosol generated when an aerosol generating substrate of the tobacco rod 210 is heated by receiving the sufficient amount of energy from the heater 130 to the filter 220b. The tube 220a is manufactured in a manner in which triacetin (TA) which a plasticizer is added to a cellulose acetate tow by more than a certain amount to form a circle, and not only is different in shape but also has a difference in arrangement in that the tobacco rod 210 and the filter 220b are connected to each other, as compared with the cross tube 205.

When the aerosol generated by the tobacco rod 210 is transferred through the tube 220a, the filter 220b performs a function of allowing a user to puff the aerosol filtered by the filter 220b by passing the aerosol therethrough. The filter 220b may include a cellulose acetate filter manufactured based on a cellulose acetate tow.

The wrapper 240 is paper that is wrapped around the cross tube 205, the tobacco rod 210, the tube 220a, and the filter 220b, and may include all of a cross tube wrapper 240b, a tobacco rod wrapper 240c, a tube wrapper 240d a filter wrapper 240e and final wrapper 240a.

In FIG. 5, the cross tube wrapper 240b is wrapped by an aluminum wrapper, the tube 220a is wrapped by an MFW or 24K wrapper, and the filter 220b is wrapped by an oil-resistant hard wrapper or a lamination of a poly lactic acid (PLA) material. The tobacco rod wrapper 240c and the final wrapper 240a will be described in more detail below.

The tobacco rod wrapper 240c is wrapped around the tobacco rod 210 and may be coated with a thermal conductivity enhancement material to maximize efficiency of thermal energy transferred by the heater 130. For example, the tobacco rod wrapper 240c may he manufactured in a manner in which a general wrapper or heterotype base paper is coated with at least one of silver foil (Ag), aluminum foil (Al), copper foil (Cu), carbon paper, filler, ceramic (MN, $Al_2O_3$), silicon carbide, sodium citrate (Na citrate), potassium citrate (K citrate), aramid fiber, nano cellulose, mineral paper, glassine paper, single-walled carbon nanotube (SWNT). A general wrapper refers to a wrapper applied to widely known cigarettes and refers to a porous wrapper made of a proven material that has both paper manufacturing workability and a thermal conductivity exceeding a certain value through a water paper test.

In addition, in the present disclosure, the final wrapper 240 may be manufactured in a manner in which an MFW (a kind of steriled paper) base paper is coated with at least one of filler, ceramic, silicon carbide, sodium citrate, potassium citrate, aramid fiber, nano cellulose, and SWNT among various materials coating the tobacco rod wrapper 240c.

The heater 130 included in the externally heated aerosol generation device 10 described in FIGS. 1 and 2 is a target controlled by the controller 110, and heats the aerosol generating substrate included in the tobacco rod 210 to generate an aerosol, and at this time, thermal energy transferred to the tobacco rod 210 is composed of a ratio of 75% by radiant heat, 15% by convective heat, and 10% by conductive heat. The ratio between the radiant heat, the convective heat, and the conductive heat constituting the thermal energy transferred to the tobacco rod 210 may be different depending on the embodiment.

In the embodiments of present disclosure, in order to overcome the difficulty in quickly generating an aerosol because thermal energy may not be transferred with the heater 130 in direct contact with an aerosol generating substrate, the tobacco rod wrapper 240c and the final wrapper 240a are coated with a thermal conductivity enhancement material to prompt an efficient transfer of the thermal energy to the aerosol generating substrate of the tobacco rod 210, and thus, a sufficient amount of aerosol may he provided to a user even during an initial puff before the heater 130 is sufficiently heated.

Depending on the embodiment, only one of the tobacco rod wrapper 240c and the final wrapper 240a may also be coated with a thermal conductivity enhancement material, and in some embodiments the tobacco rod wrapper 240c or the final wrapper 240a is coated with organic metal, inorganic metal, fiber, or polymer material which has a thermal conductivity of a preset value, as well as the above-described examples.

Figure 6:
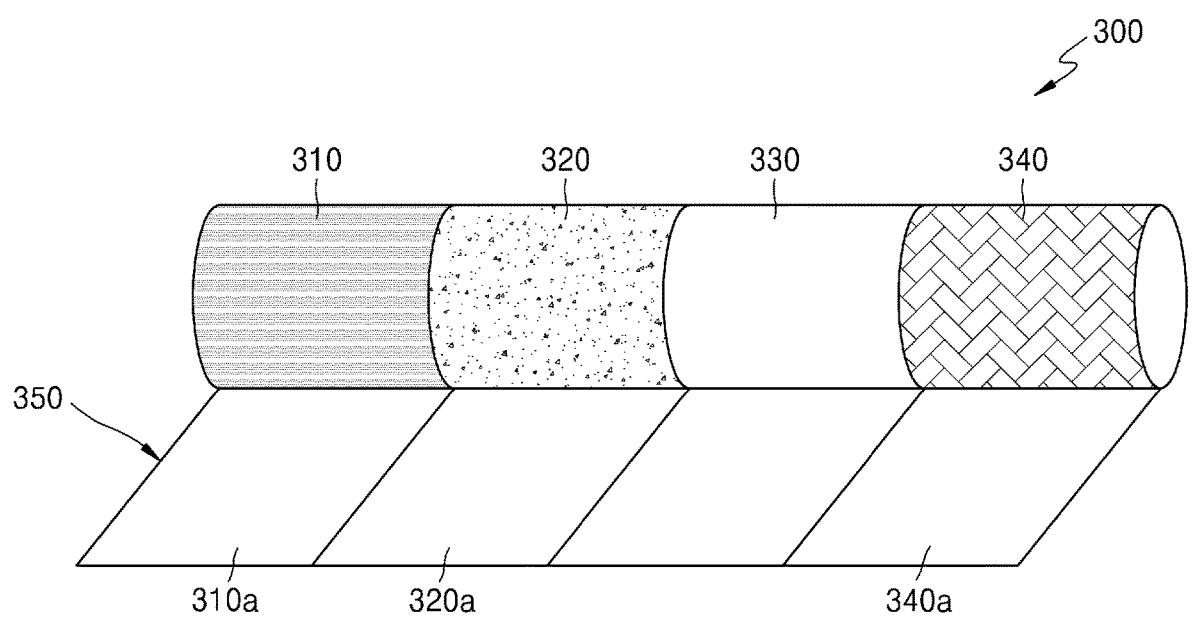
FIG. 6 is a view showing an example of a double medium cigarette used in the aerosol generating device of FIG. 3.

FIG. 6 is an example of a double medium cigarette used in the device of FIG. 3.

In FIG. 6, the double medium cigarette is named not only for the purpose of distinguishing from the cigarettes described in FIGS. 4 and 5, but also for concise description of the present invention.

Referring the FIG. 6, the double medium cigarette 300 has an aerosol base portion 310, a medium portion 320, cooling portion 330, and the filter portion 340, which are wrapped by the final wrapper 350. The aerosol base portion 310, the medium portion 320, and the filter portion 340 are wrapped by individual wrappers, and the final wrapper 350 wrapped them.

The aerosol base portion 310 is formed into a predetermined shape by containing a humectant in pulp-based paper. The aerosol base portion 310 may comprise propylene glycol or glycerin as the humectant. The humectant of the aerosol base portion 310 may comprise, propylene glycol and glycerin having a certain weight ratio to the weight of the base paper. When the double medium cigarette 300 is inserted into the aerosol generating device 10 of FIG. 3, the aerosol base portion 310 is located closest to the heater 130.

When the aerosol base portion 310 is heated to a certain temperature by the heater 130, it generates moisture vapor.

The medium portion 320 comprises one or more of a sheet, a strand, and tobacco leaves that are obtained by fine-cutting a tobacco sheet, and is a portion that generates nicotine to provide a smoking experience to a user. The medium portion 320 is not directly heated from the heater 130, even if the double medium cigarette 300 is inserted into the aerosol generating device 10 of FIG. 3.

The medium portion 320 can be heated indirectly by conduction, convection and radiation from the media wrapper (or final wrapper) wrapping the aerosol base portion 310 and the medium portion 320. In the present invention, in consideration of the characteristic that the temperature to which the medium contained in the medium portion 320 must reach is lower than the temperature to which the humectant included in the aerosol base portion 310 must reach, the aerosol base portion 310 is heated with the heater 130 to indirectly increase the temperature of the medium portion 320. When the medium portion 320 is heated to a certain temperature by the heater 130, it generates nicotine vapor.

According to a specific embodiment, when the double medium cigarette 300 is inserted into the aerosol generating device 10 of FIG. 3, a part of the medium portion 320 may face the heater 130.

The cooling portion 330 is made of a tube filter containing a plasticizer with a predetermined weight. The moisture vapor from the aerosol base portion 310 and the nicotine vapor from the medium portion 320 are mixed to be aerosolized, are cooled while passing through the cooling portion 330.

Unlike the other portions, the cooling portion 330 is not wrapped by an individual wrapper.

The filter portion 340 may be a cellulose acetate filter, and the filter portion 340 is not limited to a particular shape. For example, the filter portion 340 may be a cylinder-type rod or a tube-type rod including a cavity therein. When the filter portion 340 includes a plurality of segments, at least one of the plurality of segments may have a different shape from the others. The filter portion 340 may be manufactured to generate flavor. For example, a flavoring liquid may be sprayed to the filter portion 340 or separate fibers on which the flavoring liquid is applied may be inserted in the filter portion 340.

Also, the filter portion 340 may include at least one capsule. Here, the capsule may generate flavor or may generate aerosol. For example, the capsule may have a structure, in which a liquid containing a flavoring material is wrapped with a film. The capsule may have a circular or cylindrical shape, but is not limited thereto.

The final wrapper 350 means a wrapper that wrapping the aerosol base portion 310, the medium portion 320, and the filter portion 340 are wrapped by individual wrappers, and the final wrapper 350 wrapped them.

Figure 7:
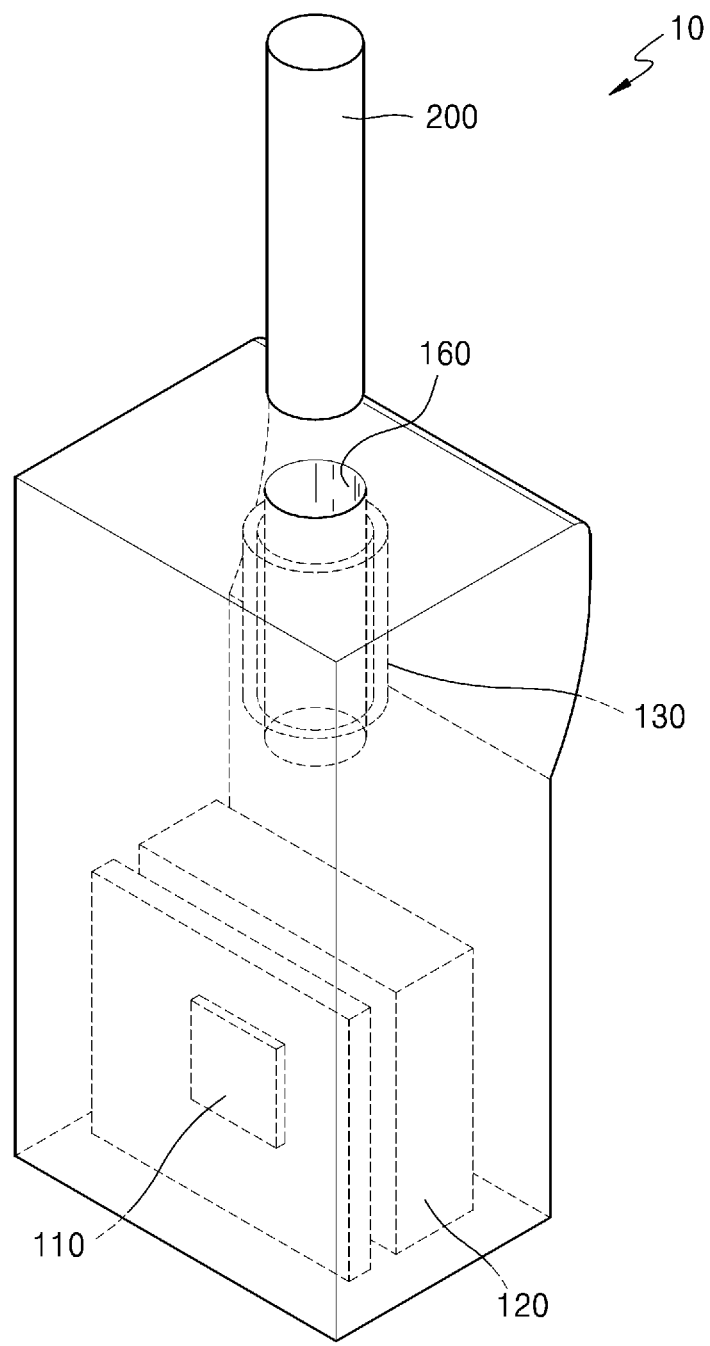
FIG. 7 is a perspective view of an example of an aerosol generating device accord to one or more embodiments.

FIG. 7 is a perspective view of an example of an aerosol generating device according to one or more embodiments.

Referring to FIG. 7, an aerosol generating device 10 according to one or more embodiments may include a controller 110, a battery 120, a heater 130, and a cigarette 200. While FIG. 7 illustrates only some components of the aerosol generating device 100 for convenience of description, it will be obvious to one of ordinary skill in the art that as long as the above components are included, adding other components does not depart from the scope of the disclosure.

In addition, the internal structure of the aerosol generating device 10 is not limited to that illustrated in FIG. 7, and, according to embodiments or design, the arrangement of the controller 110, the battery 120, the heater 130, and the cigarette 200 may be changed. Each of the components of FIG. 7 has been described above with reference to FIGS. 1 through 3, and thus, the description thereof will be omitted herein.

Figure 8:
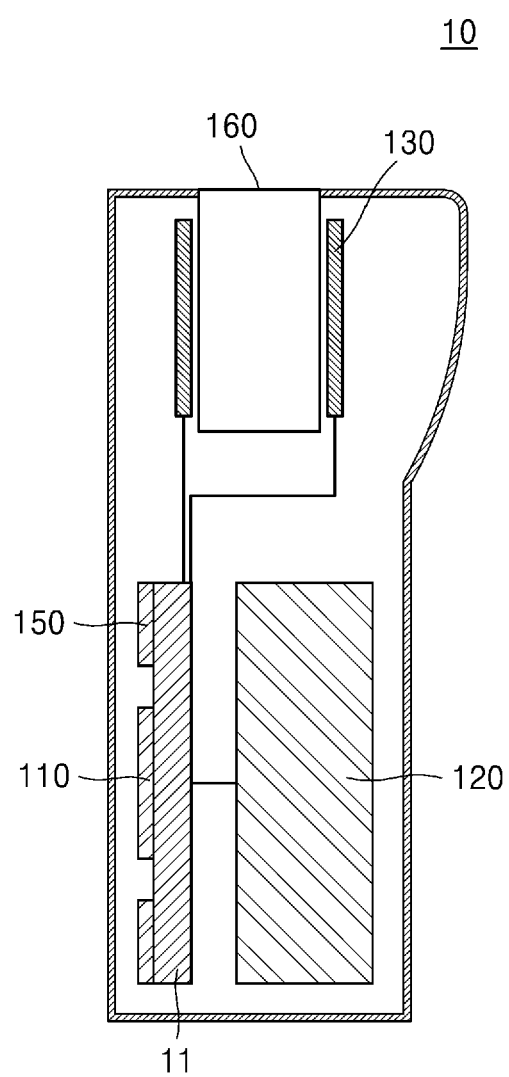
FIG. 8 is a side view of an aerosol generating device described with reference to FIG. 7.

FIG. 8 is a side view of the aerosol generating device described with reference to FIG. 7.

Referring to FIG. 8, the aerosol generating device 10 according to one or more embodiments may include a printed circuit hoard (PCB) 11, the controller 110, the battery 120, the heater 130, a display 150, and a cigarette insertion space 160. Hereinafter, the same description of components in FIG. 8 as that of components in FIG. 1 will be omitted herein.

The PCB 11 communicates with the controller 110 and electronically integrates various types of components for collecting information about the aerosol generating device 10. The controller 110 and the display 150 may be fixed and mounted on a surface of the PCB 11, and the battery 120 for supplying power to elements connected to the PCB 11 is connected to the PCB 11.

The display 150 is a device that controls information needed for a user from among information generated by the aerosol generating device 10 to be output as visual information, and controls information output to a liquid crystal display (LCD) panel (or a light-emitting diode (LED) panel)

provided on a front surface of the aerosol generating device 10, on the basis of information received from the controller 110.

The cigarette insertion space 160 refers to a space that is recessed to a certain depth inward the aerosol generating device 10 so that the cigarette 200 is inserted thereinto. The cigarette insertion space 160 has a cylindrical shape like the stick-shaped cigarette 200 so that the stick-shaped cigarette 200 is stably mounted thereinto. A height (depth) of the cigarette insertion space 160 may vary according to a length of an area of the cigarette 200 including an aerosol generating material.

For example, when the double medium cigarette 300 as shown in FIG. 6 is inserted into the cigarette insertion space 160, the height of the cigarette insertion space 160 may be equal to a value obtained by summing lengths of the aerosol substrate portion 310 and the medium portion 320. When the cigarette 200 is inserted into the cigarette insertion space 160, the heater 130 adjacent to the cigarette insertion space 160 heats, and thus, an aerosol may be generated in the cigarette 200.

The controller 110 may detect that the cigarette 200 compatible with the aerosol generating device 10 is inserted, so that a power supply to the heater 130 is started. In one or more embodiments, for stably implementing a smart-on function, an inductance channel may be further provided in addition to an existing inductance channel.

Figure 9:
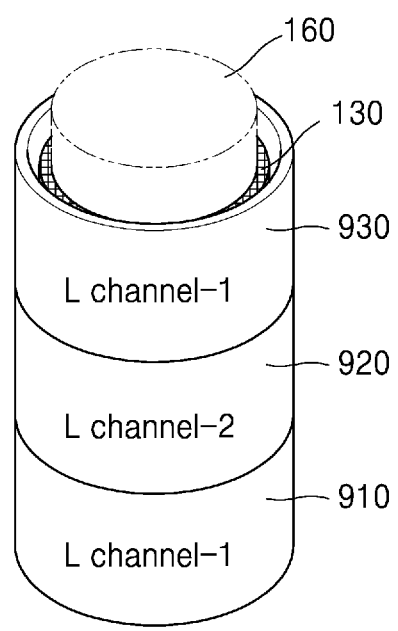
FIG. 9 is a view showing in detail an example of a cigarette insertion space and an inductance channel of FIG. 7.

FIG. 9 is a view showing in detail an example of a cigarette insertion space and an inductance channel of FIG. 7.

For convenience of description, components other than a heater 130, a cigarette insertion space 160, first inductance channels 910 and 930, and a second inductance channel 920 are omitted in FIG. 9, and both the first inductance channels 910 and 930 and the second inductance channel 920 are inductance channels including inductors.

The heater 130 is located between the cigarette insertion space 160 and an inductance channel to heat the cigarette 200 inserted into the cigarette insertion space 160. In detail, in the aerosol generating device 10 with a smart-on function, when the cigarette 200 is inserted into the cigarette insertion space 160, an aerosol is generated in an order in which an inductance channel detects that the cigarette 200 is inserted and transmits the detection result to the controller 110, and power is supplied to the heater 130.

The cigarette insertion space 160 has a cylindrical shape so that the cigarette 200 may be inserted thereinto. The cigarette insertion space 160 is a space that is recessed in a surface of the aerosol generating device 10 and is not an element made of a real material. However, for convenience of description, when the cigarette insertion space 160 is a cylindrical member, as shown in FIG. 9, the heater 130 may be arranged in a shape surrounding an outer circumferential surface of the cigarette insertion space 160.

The first inductance channels 910 and 930 are inductance channels including inductors and are arranged upstream and downstream of the second inductance channel 920 to be described later. When an object approaches (is inserted into) the inside of the cigarette insertion space 160, the first inductance channels 910 and 930 detect a frequency of current changing according to the object and transmits the detection result to the controller 110. The first inductance channels 910 and 930 have cylindrical shapes with open top ends and bottom ends and empty insides to surround the heater 130. Two first inductance channels are shown in FIG. 9, but, according to one or embodiments, the number of first inductance channels may be more or less than two. Structural characteristics of the first inductance channels 910 and 930 will be described later with reference to FIG. 10.

The second inductance channel 920 is also an inductive sensor like the first inductance channel 910. Referring to FIG. 9, the second inductance channel 920 is located between the two first inductance channels 910 and 930. In another embodiment, when one first inductance channel is provided, the second inductance channel 920 may be located upstream or downstream of the first inductance channel according to a location of the first inductance channel.

Compared to the first inductance channels 910 and 930, the second inductance channel 920 is the same as the first inductance channels 910 and 930 in terms of including an inductor. However, a winding direction of the inductor of the second inductance channel 920 is opposite to that of the inductors included in the first inductance channels 910 and 930. In addition, the inductor of the second inductance channel 920 is shielded by the heater 130 so that, even though a magnetic substance is inserted into the cigarette insertion space 160, a frequency of alternating current flowing through the inductor does not change. The second inductance channel 920 has a cylindrical shape (a hollow tube shape) with open top end and bottom end and an empty inside to surround the heater 130. A schematic description of the second inductance channel 920 will be additionally given with reference to FIGS. 11 and 12.

As described above, the aerosol generating device 10 according to one or more embodiments includes a plurality of inductance channels as components for implementing a smart-on function. An inductance channel is a passive element channel including a coil made of the number of windings, winding direction, and material that are preset. For implementing a smart-on function, alternating current having a preset frequency flows through an inductance channel even when the aerosol generating device 10 does not generate an aerosol. When an object adjacent to the cigarette insertion space 160 is a magnetic substance, a frequency of current flowing through an inductance channel (a first inductance channel) changes, and an amount of the change in the frequency exceeds a first reference value, the controller 110 detects the amount of the change in frequency of current flowing through the inductance channel, subsequently monitors an amount of a change in frequency of current flowing through an additional inductance channel (a second inductance channel), and then determines whether or not to supply power to the heater 130, according to a result of the monitoring.

When the amount of the change in frequency of current flowing through the second inductance channel is less than a second reference value, the controller 110 controls a power supply to the heater 130 to be started. When the amount of the change is equal to or exceeds the second reference value, the controller 110 determines that a cigarette is not inserted into the cigarette insertion space 160 and maintains a state in which the power supply to the heater 130 is not started. The controller 110 may determine whether or not to start the power supply to the heater 130 by storing the first reference value and the second reference value in advance or receiving the first reference value and the second reference value from a storage device (a memory).

When a smart-on function is implemented by including only an inductance channel in the aerosol generating device 10, the controller 110 may supply power to the heater 130 by detecting that the cigarette 200 is inserted into the cigarette insertion space 160 of the aerosol generating device 10. However, even though a magnetic substance causing a change in frequency of the inductance channel is accidently inserted into the cigarette insertion space 160 or is not inserted into the cigarette insertion space 160, a smart-on function malfunctions when the magnetic substance is close enough to cause the change in frequency of current flowing through the inductance channel.

The aerosol generating device 10 according to one or more embodiments solves the malfunction of the smart-on function by including an additional inductance channel (a second inductance channel) in addition to an existing inductance channel (a first inductance channel). In detail, in the aerosol generating device 10 according to one or more embodiments, a winding direction of an inductor included in the second inductance channel is opposite to that of an inductor included in the first inductance channel, and the second inductance channel is shielded by a heater. Therefore, although a cigarette or other magnetic substance including a metal foil is inserted into the cigarette insertion space 160, a frequency of current flowing through the inductor included in the second inductance channel does not change. However, when a magnetic substance is adjacent to the outside, not the cigarette insertion space 160, the malfunction of the smart-on function may be prevented through a process of changing the frequency of the current.

For example, when the cigarette 200 is inserted into the cigarette insertion space 160, an amount of a change in frequency of current flowing through the first inductance channel exceeds a first reference value, and an amount of a frequency of current flowing through the second inductance channel is less than a second reference value. Therefore, the controller 10 may control a power supply to the heater 130 to be started. As another example, when a magnetic substance causing a change in frequency of current flowing through an inductor is adjacent to the aerosol generating device 10, an amount of a change in frequency of current flowing through a first inductance channel exceeds a first reference value, and an amount of a change in frequency of current flowing through a second inductance channel exceeds a second reference value, and thus, the controller 100 maintains a current state in which power is not supplied to the heater 130.

In other words, the aerosol generating device 10 according to one or more embodiments further includes a defensive inductance channel so that a smart-on function is not activated when the cigarette 200 is not inserted into the cigarette insertion space 160, thereby fundamentally preventing an accident from occurring due to overheating of the heater 130 caused by the approach of a magnetic substance to the aerosol generating device 10 in a state that is not recognized by a user.

According to one or more embodiments, when a first inductance channel does not determine that an amount of a change in frequency exceeds a first reference value, a second inductance channel may first measure the amount of the change in frequency and transmit the measurement result to the controller 110. In addition, according to another embodiment, the controller 110 may identify an amount of a change in frequency in a first inductance channel after identifying that an amount of a change in frequency in a second inductance channel is less than a second reference value.

Figure 10:
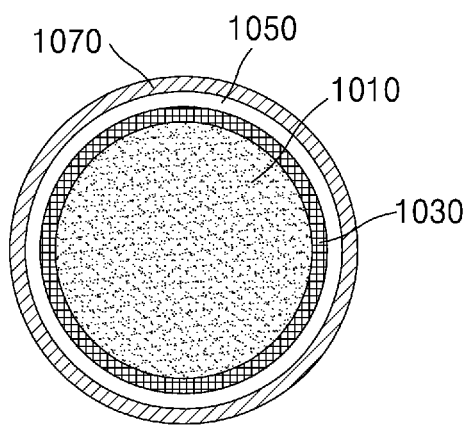
FIG. 10 is a cross-sectional view of a cigarette insertion space described with reference to FIG. 9.

FIG. 10 is a cross-sectional view of a cigarette insertion space described with reference to FIG. 9.

In detail, FIG. 10 is a view schematically illustrating a boundary between the heater 130, the cigarette insertion space 160, and an inductance channel described with reference to FIG. 9 and is a cross-sectional view vertically taken along a direction in which, when an aerosol is generated in the cigarette 200 and inhaled by a user, the aerosol moves in a combination structure of the heater 130 and the inductance channel.

A first circle 1010 in the center of FIG. 10 has a shortest diameter and appears when the cigarette insertion space 160 is observed from above. The first circle 1010 represents an empty space of the cigarette insertion space 160 so that a cigarette having a diameter less than the diameter of the first circle 1010 may be mounted in the cigarette insertion space 160.

A first ring 1030 having a shape surrounding the first circle 1010 appears when the heater 130 described with reference to FIGS. 7 through 9 is observed from above. As described above, the heater 130 has a ring shape with an empty inside and a constant thickness to surround the outer circumferential surface of the cigarette insertion space 160.

A second ring 1050 having a shape surrounding the first ring 1030 represents a spacing or material between the first ring 1030 and a third ring 1070. The second ring 1050 appears when observing, in a cross-sectional view, a space or material provided to prevent an inductance channel from being damaged by heat of the started heater 130 when the heater 130 heats. The second ring 1050 may be made of a material having an extremely low thermal conductivity, such as an insulating material.

The third ring 1070 has a shape surrounding the second ring 1050 and appears when an inductance channel as described with reference to FIG. 9 is observed from above. An inductance channel has a cylindrical shape surrounding once more an outer circumferential surface of the heater 130 surrounding the cigarette insertion space 160. Referring to FIG. 10, the inductance channel may have a ring shape with an empty inside and a constant thickness to surround the outer circumferential surface of the heater 130. FIG. 10 shows an example of a combination structure of the heater 130 and the inductance channel. According to one or more embodiments, the inductance channel may be implemented in a cylindrical shape surrounding both the heater 130 and a portion of the cigarette insertion space 160, as described later with reference to FIG. 11.

Figure 11:
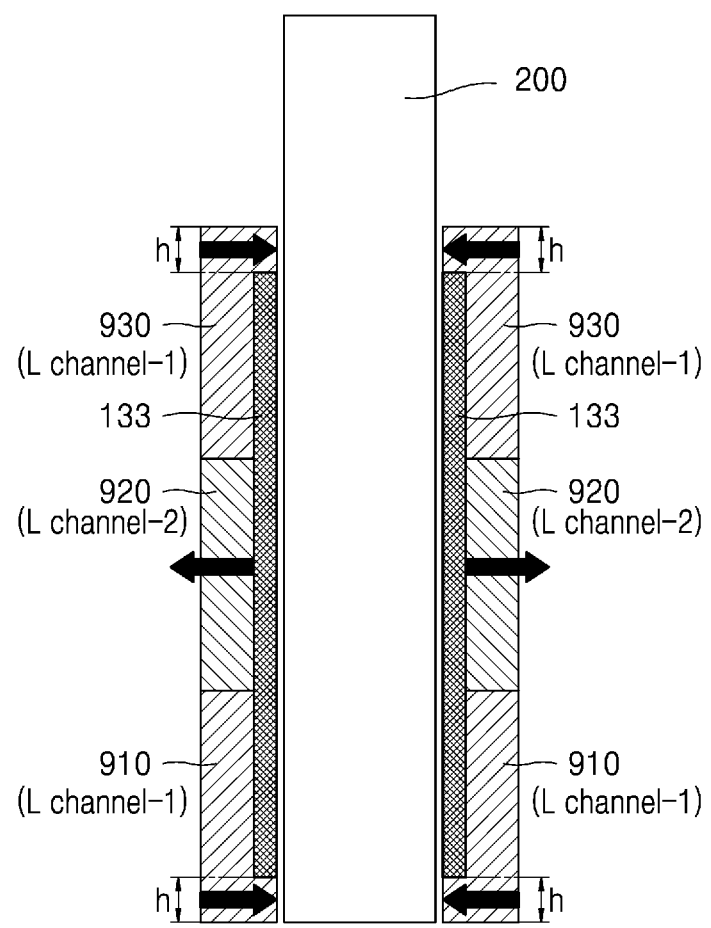
FIG. 11 is a view schematically showing an example of an arrangement of an inductance channel.

FIG. 11 is a view schematically showing an example of an arrangement of an inductance channel.

FIG. 11 is a cross-sectional view showing a combination structure of the heater 130, the cigarette insertion space 160, the first inductance channels 910 and 930, and the second inductance channel 920 described with reference to FIG. 9 and may be understood as a cross-sectional view in a direction different from that of FIG. 10. For convenience of description, a spacing (material) between the heater 130 and the inductance channel described with reference to FIG. 10 will be omitted in FIG. 11.

Referring to FIG. 11, an inductance channel is formed of three layers as shown in FIG. 9, the cigarette 200 is inserted into the cigarette insertion space 160, and the heater 130 is located between the cigarette insertion space 160 and inductance channels. The heater 130 may be a susceptor that may be heated by a coil of an inductance channel to increase the temperature of a first medium portion 310 of the cigarette 200.

First inductance channels 910 and 930 are inductance channels and include therein inductors having the same winding direction. The first inductance channels 910 and 920 have, toward the center of the cigarette insertion space 160, detection areas h that are not shielded by the heater 130. A medium portion of the cigarette 200 inserted into the cigarette insertion space 160 includes a metal foil having a high thermal conductivity to increase the heating efficiency of an aerosol generating material. A magnetic field generated by current flowing through inductors included in the first inductance channels 910 and 930 may be affected by the metal foil of the cigarette 200 through the detection areas h, and a frequency of the current may change. As an example, the detection areas h may have a length of 4 mm.

A second inductance channel 920 is an inductive sensor including an inductor like the first inductance channels 910 and 930. However, the inductor of the second inductance channel 920 is wound in a direction opposite to a winding direction of the inductors included in the first inductance channels 910 and 930. The second inductance channel 920 is shielded by the heater 130, and the inductor included in the second inductance channel 920 detects a magnetic substance in a direction opposite to the center of the cigarette insertion space 160 according to a winding direction thereof. Therefore, a frequency of current flowing through the inductor of the second inductance channel 920 may not be changed by the cigarette 200 inserted into the cigarette insertion space 160 but may be changed when an external magnetic substance approaches.

The cigarette 200 is briefly shown in FIG. 11 but may be applied not only to the cigarette 200 having one medium portion described with reference to FIG. 4 but also to the double medium cigarette 300 described with reference to FIG. 6. When the double medium cigarette 300 is applied, the heater 130 shown in FIG. 11 may be implemented as two heaters that may heat to different temperatures, Summarizing FIG. 11, the aerosol generating device 10 according to one or more embodiments is an externally heated aerosol generating device and includes a plurality of inductance channels. When the aerosol generating device 10 is implemented in a form including three inductance channels, the aerosol generating device 100 may be implemented in a form in which one second inductance channel for detecting a magnetic substance other than the cigarette 200 is located between two first inductance channels for detecting that the cigarette 200 is inserted into the cigarette insertion space 160. In addition, FIG. 11 illustrates an embodiment of the disclosure, and thus, it will be obvious to one of ordinary skill in the art that, according to one or more embodiments, the number or arrangement of inductance channels may extend in a manner that is not described in FIG. 11, FIG. 12 is a schematic view illustrating, in a different manner, a combination structure of a cigarette insertion space and an inductance channel described with reference to FIG. 11.

Figure 12:
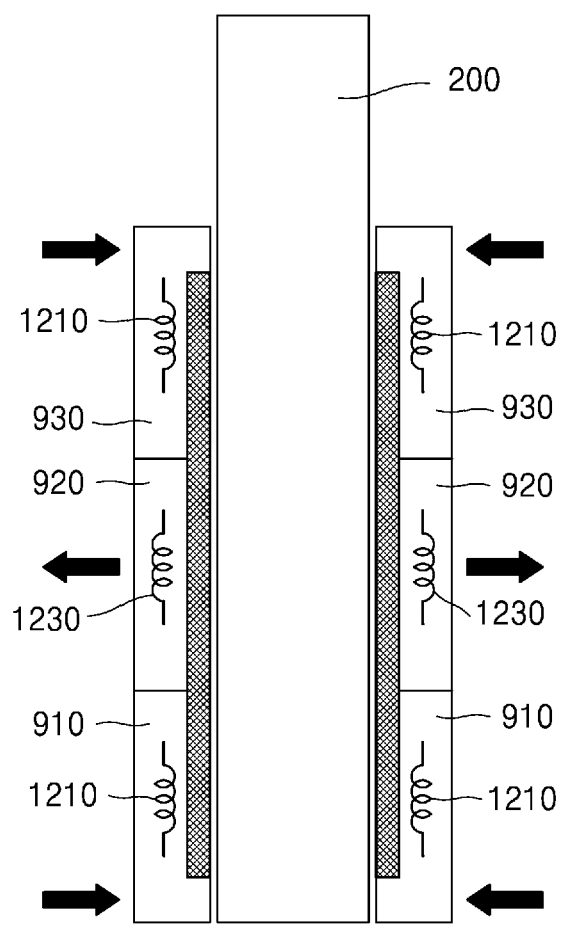
FIG. 12 is a schematic view showing, in a different manner, a combination structure of a cigarette insertion space and an inductance channel described with reference to FIG. 11.

In detail, FIG. 12 shows a structure in which first inductance channels 910 and 930 detect a magnetic substance toward the center of the cigarette insertion space 160 by including inductors wound in the same winding direction, and a second inductance channel 920 detects magnetic substances approaching from the outside by including an inductor wound in a direction opposite to the inductors of the first inductance channels 910 and 930.

Figure 13:
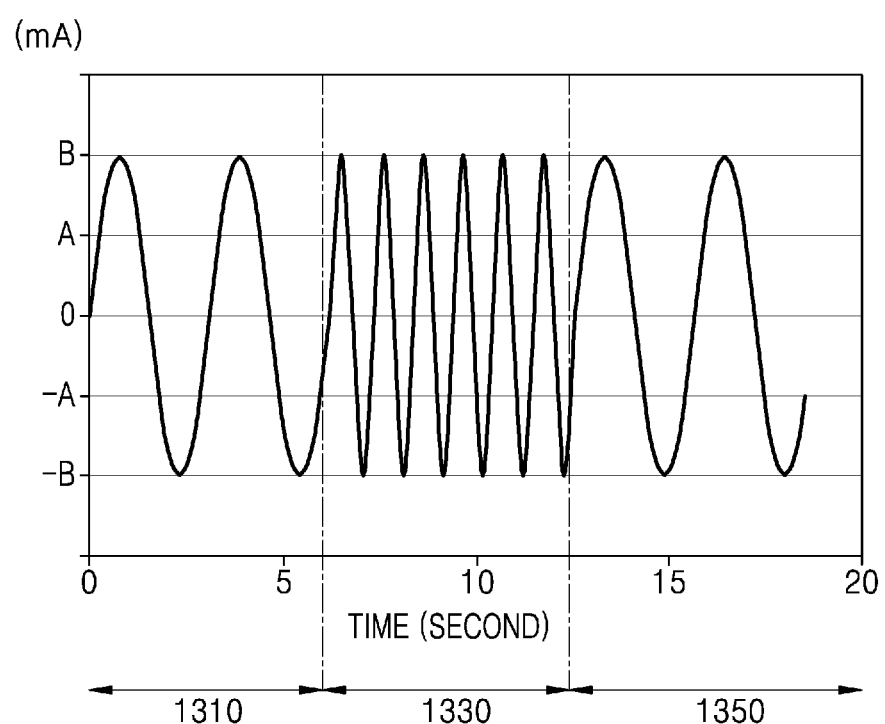
FIG. 13 is an example of a graph showing a change in frequency detected by an inductance channel.

FIG. 13 is an example of a graph showing a change in frequency detected by an inductance channel.

Referring to FIG. 13, alternating current flowing through an inductance channel has a constant frequency in an initial period 1310, has a frequency changing in a 6.2-second period 1330, and has a normal frequency in a 12.4-second period 1350. The controller 110 of the aerosol generating device 10 according to one or more embodiments determines whether or not an amount of a change in frequency exceeding a first reference range is detected while monitoring a change in the alternating current flowing through the inductance channel. FIG. 13 shows a current waveform of an inductor of a first inductance channel for detecting the cigarette 200 inserted into the cigarette insertion space 160.

The controller 110 according to one or more embodiments does not determine whether or not to start a power supply to the heater 130, by using only an amount of a change in frequency in the first inductance channel. Therefore, even when a change in frequency exceeding a first reference value is detected in 6.2 seconds as shown in FIG. 13, a power supply to the heater 130 is not immediately started by using only the detected change in frequency.

Figure 14:
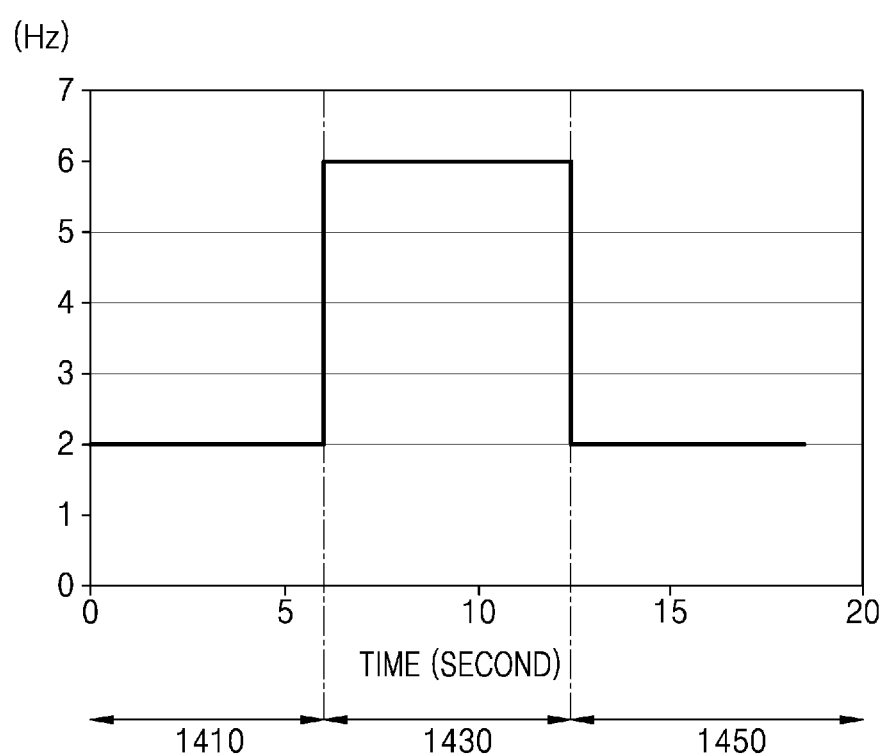
FIG. 14 is another example of a graph showing a change in frequency detected by an inductance channel.

FIG. 14 is another example of a graph showing a change in frequency detected by an inductance channel.

While the inductance channel described with reference to FIG. 13 measures vibrations of a maximum value and a minimum value in a sinusoidal current and transmits the measurement result to the controller 110, the inductance channel described with reference to FIG. 14 includes an LDC (an inductive digital converter) sensor to immediately determine a change in frequency (each frequency) of alternating current and transmit the determination result to the controller 110. The vertical axis of FIG. 14 represents a frequency value, not a current value, Therefore, comparing FIG. 14 to FIG. 13, FIG. 14 is a graph in the form of a step function rather than a sine function. According to one or more embodiments, when an interrupt occurs in the LDC sensor, the controller 110 may immediately determine, via the interrupt, whether or not an amount of a change in frequency exceeds a first reference range.

Figure 15:
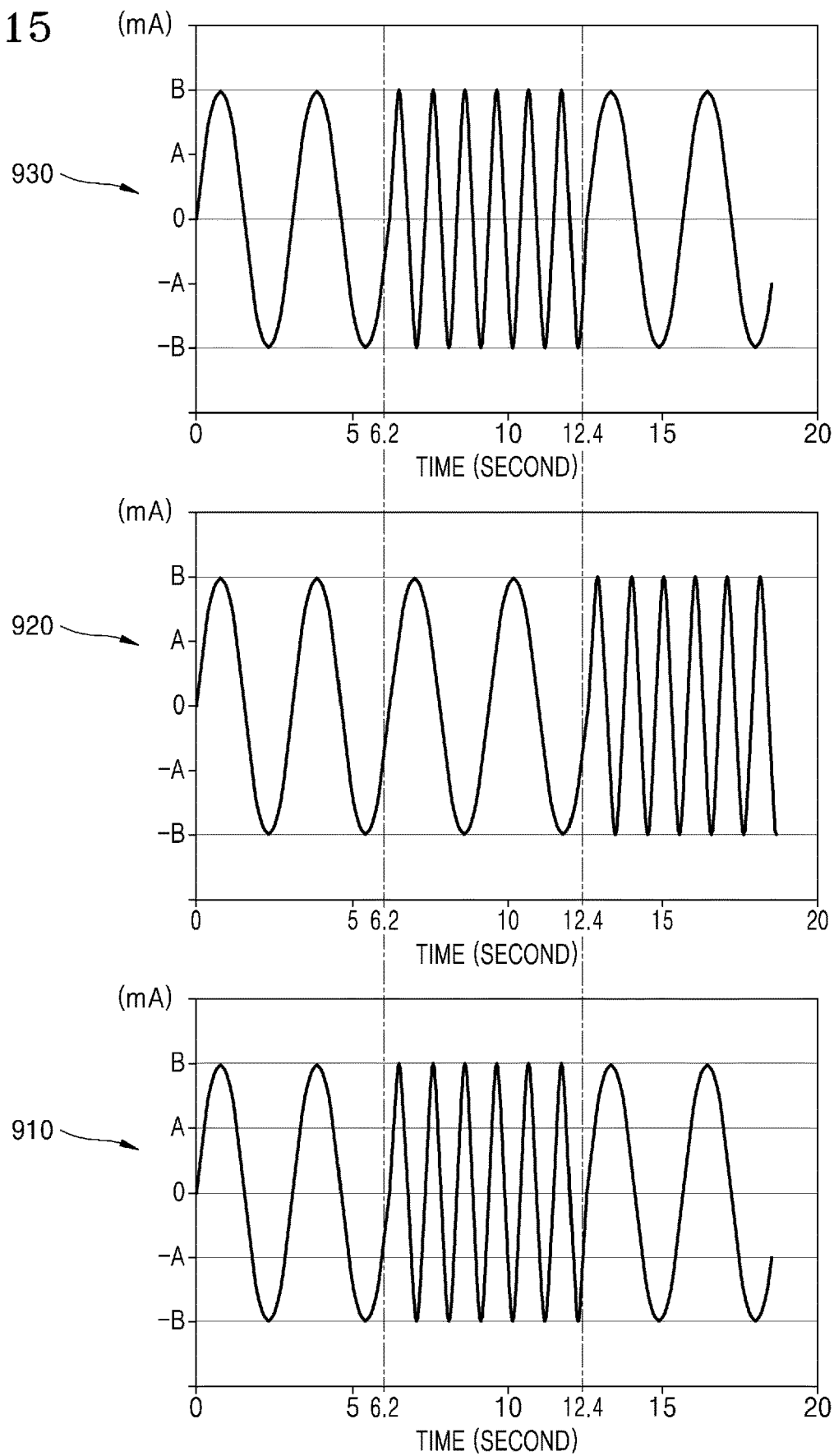
FIG. 15 is examples of graphs showing changes in frequencies of currents detected by a first inductance channel and a second inductance channel.

FIG. 15 is an example of a graph showing changes in frequency of current detected by first inductance channels and a second inductance channel.

Referring to FIG. 15, reference numerals 910 and 930 refer to inductance channels corresponding to the first inductance channels 910 and 930 described with reference to FIG. 11.

In a 6.2-second period in FIG. 15, a frequency of current flowing through inductors of the first inductance channels is changed, but a frequency of current flowing through an inductor of the second inductance channel is not changed. The controller 160 may start a power supply to the heater 130 on the basis of a detection result in the 6.2-second period.

In a 12.4-second period in FIG. 15, the frequency of current flowing through the inductors of the first inductance channels returns to the previous 6.2-second period, and the frequency of current flowing through the inductor of the second inductance channel is significantly changed. As shown in FIG. 5, the change in frequency of current flowing through the inductor of the second inductance channel is because the cigarette 200 inserted into the cigarette insertion space 160 changes a magnetic flux of the inductor of the second inductance channel in a process of being decoupled from the cigarette insertion space 160. Also, because an amount of the change in frequency of current flowing through the first inductance channels already becomes 0, the controller 110 controls power not to be supplied to the heater 130 from the 12.4-second period.

Figure 16:
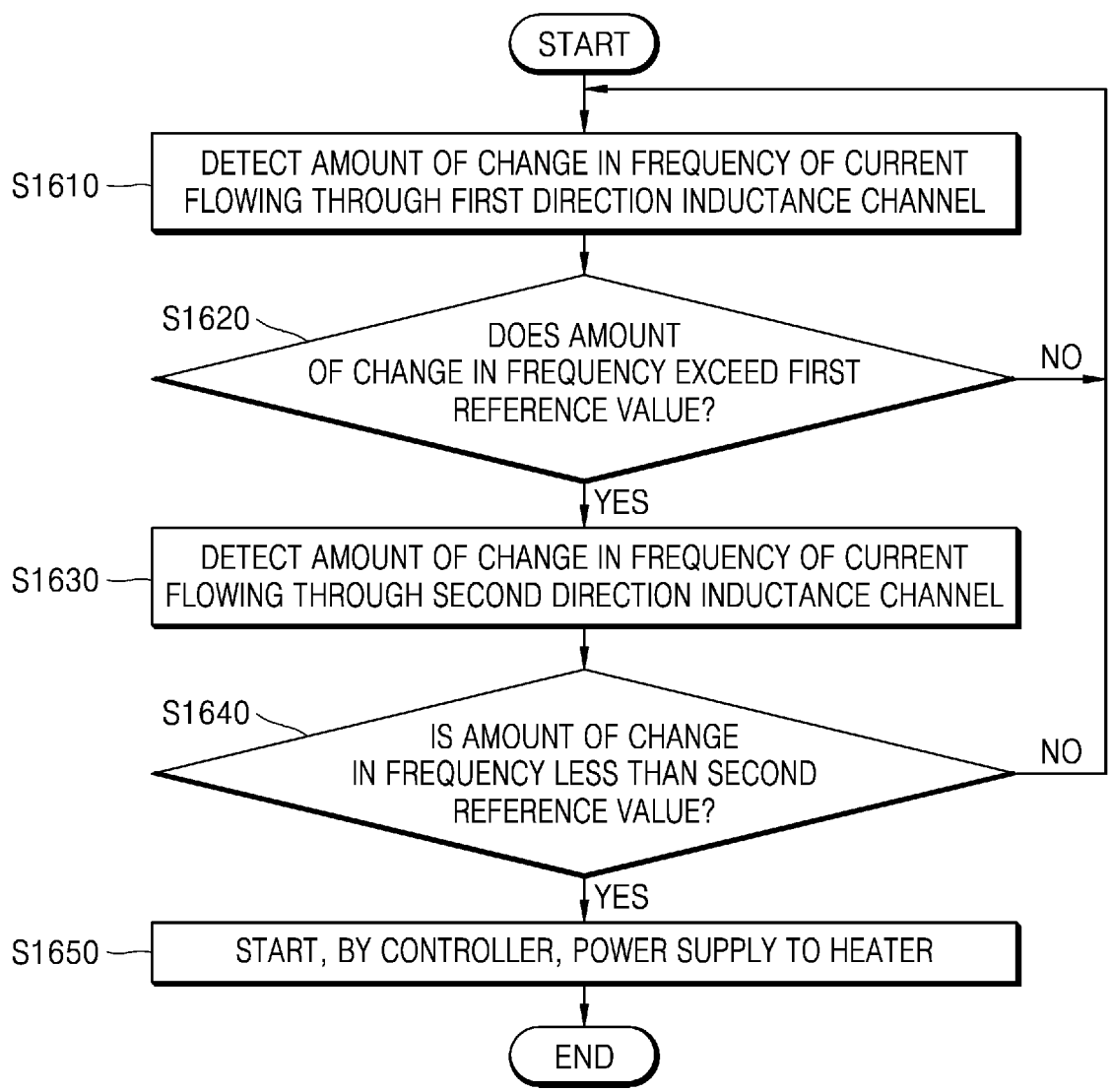
FIG. 16 is a flowchart sequentially showing a process of operating an externally heated aerosol generating device according to one or more embodiments.

FIG. 16 is a flowchart sequentially showing a process of operating an externally heated aerosol generating device according to one or more embodiments.

A method illustrated in FIG. 16 may be implemented by the externally heated aerosol generating device 10 described with reference to FIGS. 1 through 15, and thus, the same description of the method of FIG. 16 as that in FIGS. 1 through 15 will be omitted herein, Hereinafter, first direction inductance channels refer to the first inductance channels 910 and 930 of FIG. 11, and a second direction inductance channel refers to the second inductance channel 920 of FIG. 11.

The controller 110 detects an amount of a change in frequency of current flowing through the first direction inductance channels in operation S1610 and determines whether or not the amount of the change in frequency exceeds a first reference value in operation S1620.

When the amount of the change in frequency exceeds the first reference value in operation S1620, the controller 110 detects an amount of a change in frequency of current flowing through the second direction inductance channel in operation S1630.

When the controller 110 determines, in operation S1640, that the amount of the change in frequency detected in operation S1630 is less than a second reference value, the controller 110 starts a power supply to the heater 130 in operation S1650. When the amount of the change in frequency detected in operation S1630 is greater than or equal to the second reference value, the controller 110 determines that the cigarette 200 is not inserted into the cigarette insertion space 160 and does not start the power supply to the heater 130.

The specific implementations described in the present disclosure are example embodiments and do not limit the scope of the present disclosure in any way. For brevity of the specification, descriptions of existing electronic configurations, control systems, software, and other functional aspects of the systems may be omitted. Connections of lines or connection members between components illustrated in the drawings illustratively show functional connections and/or physical or circuit connections and may be represented as alternative or additional various functional connections, physical connections, or circuit connections in an actual device. Unless specifically mentioned, such as "essential", "importantly", etc., the components may not be necessary components for application of the present disclosure.

As used herein (in particular, in claims), use of the term "the" and similar indication terms may correspond to both singular and plural. When a range is described in the present disclosure, the present disclosure may include the invention to which individual values belonging to the range are applied (unless contrary description), and each individual value constituting the range is the same as being described in the detailed description of the disclosure. Unless there is an explicit description of the order of the steps constituting the method according to the present disclosure or a contrary description, the steps may he performed in an appropriate order. The present disclosure is not necessarily limited to the description order of the steps. The use of all examples or example terms (for example, etc.) is merely for describing the present disclosure in detail, and the scope of the present disclosure is not limited by the examples or the example terms unless the examples or the example terms are limited by claims. It will be understood by one of ordinary skill in the art that various modifications, combinations, and changes may be made according to the design conditions and factors within the scope of the appended claims or equivalents thereof.

INDUSTRIAL APPLICABILITY

One or more embodiments may be used to manufacture a next generation electronic cigarette device.

The invention claimed is:

1. An aerosol generating device comprising an inductance channel, the aerosol generating device comprising:
   a heater configured to generate an aerosol by heating a cigarette;
   a cigarette insertion space into which the cigarette is inserted;
   a first inductance channel in which a frequency of current is changeable by an object inserted into the cigarette insertion space;
   a second inductance channel in which a frequency of current is changeable when an external magnetic substance approaches toward the aerosol generating device; and
   a controller configured to generate a control signal by using information received from the first inductance channel and the second inductance channel, wherein
   the controller is configured to
      measure, when an amount of a change in the frequency of the current flowing through the first inductance channel exceeds a first reference value, an amount of a change in the frequency of the current flowing through the second inductance channel,
      control, when the measured amount of the change in the frequency of the current flowing through the second inductance channel is less than a second reference value, a power supply to the heater to be started, and
      control, when the measured amount of the change in the frequency of the current flowing through the second inductance channel is equal to or exceeds the second reference value, the power supply to the heater not to be started.

2. The aerosol generating device of claim 1, wherein the first inductance channel includes two or more inductors.

3. The aerosol generating device of claim 1, wherein the first inductance channel includes two inductors, and the second inductance channel includes one inductor.

4. The aerosol generating device of claim 3, wherein the inductors of the first inductance channel are spaced apart from each other on the basis of the second inductance channel.

5. The aerosol generating device of claim 1, wherein
   a winding direction of an inductor constituting the first inductance channel is different from a winding direction of an inductor constituting the second inductance channel.

6. The aerosol generating device of claim 1, wherein at least one of the first inductance channel and the second inductance channel is arranged adjacent to the cigarette insertion space.

7. The aerosol generating device of claim 1, wherein
   the cigarette insertion space is recessed in a cylindrical shape so that a portion of the cigarette is inserted thereinto and heated by the heater, and
   the first inductance channel and the second inductance channel are arranged in shapes surrounding an outer circumferential surface of the cigarette insertion space.

8. The aerosol generating device of claim 1, wherein the heater is a susceptor that heats according to the change in the current.

9. The aerosol generating device of claim 1, wherein
   the heater is divided into a first heater and a second heater according to a height of the cigarette insertion space, and
   the first heater and the second heater heat to different temperatures.

10. The aerosol generating device of claim 9, wherein the first inductance channel includes two inductors, and the inductors included in the first inductance channel are arranged to correspond to the first heater and the second heater, respectively.

11. An aerosol generating device comprising an inductance channel, the aerosol generating device comprising:
- a heater configured to generate an aerosol by heating a cigarette;
- a cigarette insertion space into which the cigarette is inserted;
- a first inductance channel in which a frequency of current is changed by an object inserted into the cigarette insertion space;
- a second inductance channel shielded by the heater so that a frequency of current flowing therethrough is not changed by the object inserted into the cigarette insertion space; and
- a controller configured to generate a control signal by using information received from the first inductance channel and the second inductance channel, wherein,
- when an amount of a change in frequency of current flowing through the first inductance channel exceeds a first reference value and an amount of a change in frequency of current flowing through the second inductance channel is less than a second reference value, the controller controls a power supply to the heater to be started.

12. The aerosol generating device of claim 11, wherein the first inductance channel includes two or more inductors.

13. The aerosol generating device of claim 11, wherein the first inductance channel includes two inductors, and the second inductance channel includes one inductor.

14. The aerosol generating device of claim 13, wherein the inductors of the first inductance channel are spaced apart from each other on the basis of the second inductance channel.

15. The aerosol generating device of claim 11, wherein a winding direction of an inductor constituting the first inductance channel is different from a winding direction of an inductor constituting the second inductance channel.

16. The aerosol generating device of claim 11, wherein at least one of the first inductance channel and the second inductance channel is arranged adjacent to the cigarette insertion space.

17. The aerosol generating device of claim 11, wherein
the cigarette insertion space is recessed in a cylindrical shape so that a portion of the cigarette is inserted thereinto and heated by the heater, and
the first inductance channel and the second inductance channel are arranged in shapes surrounding an outer circumferential surface of the cigarette insertion space.

18. The aerosol generating device of claim 11, wherein the heater is a susceptor that heats according to the change in the current.

19. The aerosol generating device of claim 11, wherein
the heater is divided into a first heater and a second heater according to a height of the cigarette insertion space, and
the first heater and the second heater heat to different temperatures.

20. The aerosol generating device of claim 19, wherein
the first inductance channel includes two inductors, and
the inductors included in the first inductance channel are arranged to correspond to the first heater and the second heater, respectively.

* * * * *